US008664321B2

(12) United States Patent
Schuster et al.

(10) Patent No.: US 8,664,321 B2
(45) Date of Patent: *Mar. 4, 2014

(54) PROCESS FOR THE CONTINUOUS PREPARATION OF HIGH VISCOSITY SILICON COMPOSITIONS

(75) Inventors: Johann Schuster, Emmerting (DE); Stefan Dietl, Burghausen (DE); Stefan Schneiderbauer, Altoetting (DE)

(73) Assignee: Wacker Chemie AG, Munich (DE)

( * ) Notice: Subject to any disclaimer, the term of this patent is extended or adjusted under 35 U.S.C. 154(b) by 886 days.

This patent is subject to a terminal disclaimer.

(21) Appl. No.: 12/629,073

(22) Filed: Dec. 2, 2009

(65) Prior Publication Data
US 2010/0152327 A1   Jun. 17, 2010

(30) Foreign Application Priority Data

Dec. 11, 2008   (DE) .......................... 10 2008 054 536

(51) Int. Cl.
*C08K 3/34* (2006.01)

(52) U.S. Cl.
USPC ........................................................ 524/493

(58) Field of Classification Search
USPC .......... 425/204, 205; 264/211.23; 366/75, 77, 366/84, 85, 86, 91, 97, 186, 76.4, 76.93, 9; 524/493
See application file for complete search history.

(56) References Cited

U.S. PATENT DOCUMENTS

| 4,954,303 A * | 9/1990 | Moore et al. .................. 264/101 |
| 5,854,343 A | 12/1998 | Schuster et al. |
| 5,872,172 A | 2/1999 | Kimura et al. |
| 6,124,392 A | 9/2000 | Heisler et al. |
| 6,323,262 B1 | 11/2001 | Achenbach et al. |
| 2001/0047049 A1 | 11/2001 | Heisler et al. |
| 2004/0192809 A1* | 9/2004 | Heisler et al. .................. 523/348 |
| 2006/0247406 A1 | 11/2006 | Reitmeier et al. |
| 2010/0160543 A1* | 6/2010 | Frese et al. ..................... 524/588 |

FOREIGN PATENT DOCUMENTS

| EP | 1110696 A2 | 6/2001 |
| GB | 2384488 A | 7/2003 |
| JP | 6099429 A | 4/1994 |
| JP | 10-53652 A | 2/1998 |
| JP | 10-168316 A | 6/1998 |
| JP | 2000-256469 A | 9/2000 |
| JP | 2002-20551 A | 1/2002 |
| JP | 2002-241508 A | 8/2002 |
| JP | 2004-291642 A | 10/2004 |
| JP | 2006-307219 A | 11/2006 |

* cited by examiner

*Primary Examiner* — Ling Choi
*Assistant Examiner* — Lanee Reuther
(74) *Attorney, Agent, or Firm* — Brooks Kushman P.C.

(57) ABSTRACT

Organopolysiloxane compositions having a 25° C. viscosity of at least 500 Pa·s., are continuously prepared by mixing and kneading organopolysiloxanes and fillers in a first process stage, in a kneading cascade having at least two kneading chambers arranged in series each containing two kneading tools on parallel axes, capable of being driven in corotating or counterrotating directions, the chambers connected to one another by means of openings through which material can pass in a direction transverse to the axes of the kneading tools, the first kneading chamber having a feed opening and the last kneading chamber having a discharge opening, to give raw mixtures and kneading and degassing the raw mixtures, in a second process stage at from 100° C. to 250° C. in a continuously operated double trough kneader having a discharge screw.

16 Claims, 1 Drawing Sheet

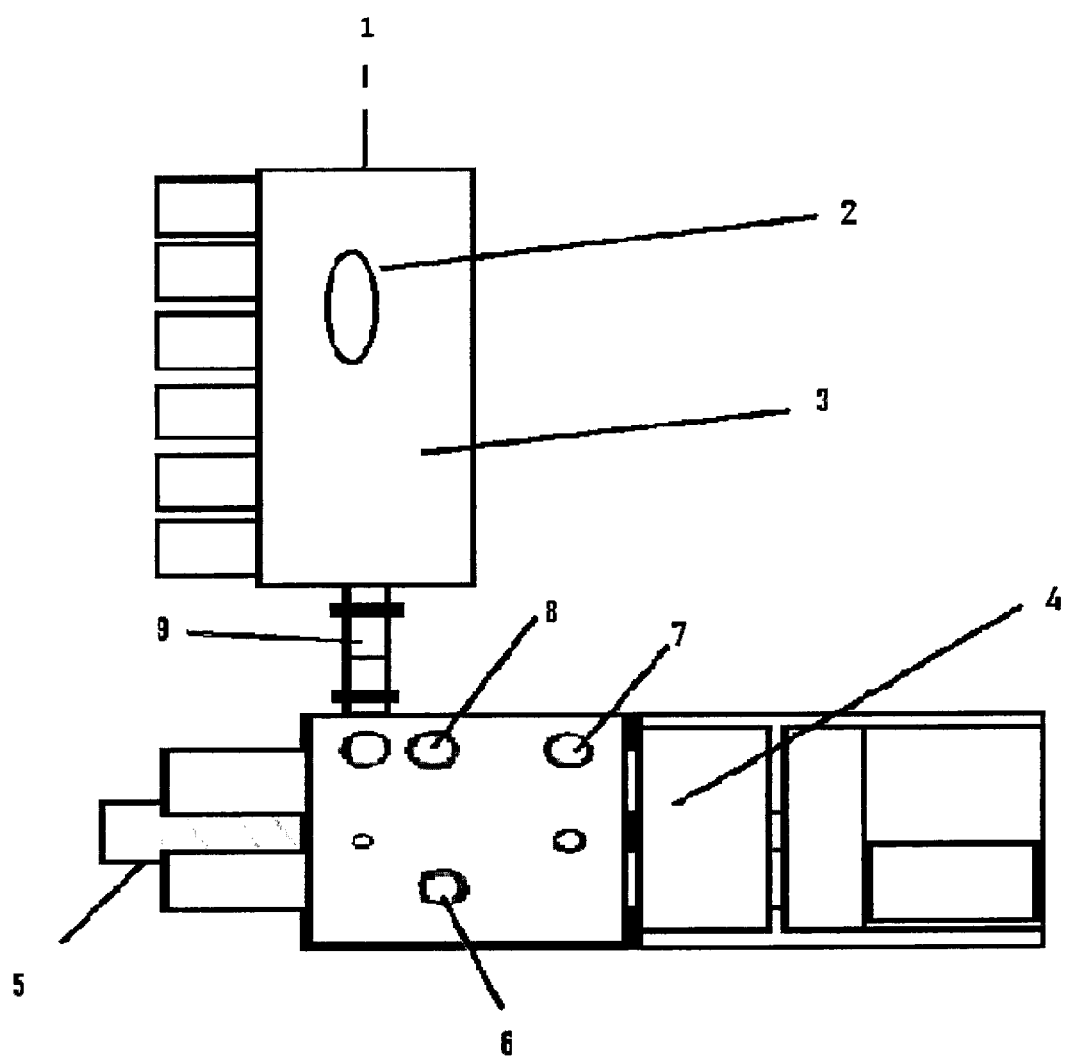

PROCESS FOR THE CONTINUOUS PREPARATION OF HIGH VISCOSITY SILICON COMPOSITIONS

CROSS-REFERENCE TO RELATED APPLICATIONS

This application claims priority to German Patent Application No. DE 10 2008 054 536.8 filed Dec. 11, 2008, which is herein incorporated by reference.

BACKGROUND OF THE INVENTION

1. Field of the Invention

The invention relates to a process for preparing organopolysiloxane compositions in a kneading cascade having at least two kneading chambers which are arranged in series next to one another and a continuously operating double-trough kneader.

2. Background Art

EP 570387 A describes a process for the continuous preparation of HTV silicone compositions, in which the incorporation of filler into the polysiloxane and the degassing are carried out in one step in a single-screw reciprocating kneader. However, the machine can be separated so that the mixing process can take place in the first kneader and the degassing step can take place in the second kneader. Owing to phase inversion, dry friction and the mechanical destruction of high molecular weight polyorganosiloxanes, the storage stability of the product is reduced. In addition, satisfactory throughputs cannot be achieved using this machine concept.

A further process development is described in EP 1033389A. To improve the storage stability in particular, the process is extended by a rubber recirculation which is supposed to prevent phase inversion and thus is supposed to reduce the tendency of the HTV compositions prepared in this way to become stiff and brittle. Two-stage processes are not mentioned in EP 1033389A. The process is made very complicated in engineering terms by the recirculation of product, so that economical operation is not possible. The throughout is also unsatisfactory in this process since the recirculation of product greatly reduces the space-time yield of the plant.

EP 1110696 A describes a two-stage process for preparing HTV silicone compositions. In the first part of this process, mixing of filler and silicone polymer and also hydrophobicizing agents and plasticizers takes place in a corotating twin-screw extruder. In the second part of the process, the mixture is then compounded fully and degassed in a single-screw reciprocating kneader. Compared to EP 570387 A, the process of EP 1110696 A is supposed to be superior in terms of throughput and improved filler distribution. However, EP 570387 A states that twin-screw machines are problematic in terms of machine wear and abrasion of metal and can result in undesirable gray coloration of the HTV compositions produced. This applies particularly to highly filled stiff mixtures.

EP 807509 A describes the continuous preparation of storage-stable organopolysiloxane compositions using a specific cascade of kneading machines. The objective is to produce base compositions for addition-crosslinking liquid rubbers. Degassing of the composition occurs only via a degassing vessel, not by means of a specifically designed machine. According to EP 807509 A, HTV compositions can also be prepared using a kneading cascade. Owing to the lack of opportunities for degassing or unsuitable degassing facilities, HTV rubbers produced by this process are unusable, however.

EP 1468803 A describes a process in which a kneading cascade comprising at least two kneading chambers which are arranged in series next to one another and each contain two kneading tools which have parallel axes and are capable of being driven in corotating or counterrotating directions and which are connected to one another by means of openings through which material can pass in a direction transverse to the axes of the kneading tools is used. From this kneading cascade, the now plastic crude rubber is pumped into a reciprocating kneader in which the material can be kneaded and degassed.

This process has the disadvantage that technical limits are reached which do not permit throughputs averaged over all products of greater than 1500 kg/h are reached. Various factors are limiting. Limiting factors are firstly the introduction of filler and secondly the residence time since the average residence time inevitably decreases when the throughput is increased, which has an adverse effect on quality. The adverse effect becomes particularly clear in the properties of: yellow coloration in the case of peroxidic crosslinking; bubble formation during extrusion; and storage stability. The process described in EP 1468803 A does not contain any buffer facilities, so that in the event of a malfunction backing up of material immediately occurs and the plant has to be shut down or crude rubber has to be discharged and then processed further in another plant.

SUMMARY OF THE INVENTION

The invention provides a continuous process for preparing organopolysiloxane compositions (A) having a viscosity measured at 25° C. of at least 500 Pa·s., in which organopolysiloxanes (O) and fillers (F) are, in a first process stage, mixed and kneaded in a kneading cascade having at least two kneading chambers which are arranged in series next to one another and each contain two kneading tools which have parallel axes and are capable of being driven in corotating or counterrotating directions and which are connected to one another by means of openings through which material can pass in a direction transverse to the axes of the kneading tools, with the first kneading chamber having a feed opening and the last kneading chamber having a discharge opening, to give raw mixtures, and the raw mixtures are, in a second process stage, kneaded and degassed at from 100° C. to 250° C. in a continuously operated double trough kneader having a discharge screw.

Compared to the process of EP 1468803 A, the process of the invention can be operated at throughputs which are from two to three times as high. In addition, the quality can be improved. Furthermore, the process has the process engineering advantage that, owing to the good buffering action of the double trough kneader, it is not necessary to shut down the entire plant in the event of small malfunctions in the cooling band, strainer and packaging region.

In the process of the invention, each kneading chamber of the kneading cascade has a separate drive, and the intensity of the mixing, compacting and kneading process can thus be controlled very precisely for each specific chamber.

Such precise control of the mixing, compacting and kneading process is not possible when using a twin-screw machine as described in EP 1110696A. The rubber composition is completely homogeneous like a finished rubber at the latest in the last chamber of the kneading cascade. In addition, the rubber composition has experienced a kneading power which has been exerted reproducibly via the drives of the individual kneading chambers.

The kneading cascade used according to the invention is a kneading machine and allows the intensity of the kneading process and the residence time to be controlled, because speed of rotation and direction of rotation of the kneading tools can be set independently in the individual kneading chambers.

BRIEF DESCRIPTION OF THE DRAWINGS

FIG. 1 illustrates one embodiment of the invention.

DETAILED DESCRIPTION OF THE PREFERRED EMBODIMENT(S)

Since no free gas space is present in the kneading cascade, protective gas can be dispensed with. The feed hopper for the addition of the fillers is preferably blanketed with nitrogen.

Discharge of product from the kneading cascade presents no problem because the finished compositions can easily be conveyed to the discharge opening by means of the kneading tools. The last kneading chamber preferably has pumping blades for product discharge.

The kneading cascade preferably comprises a maximum of 10 kneading chambers; a maximum of 6 chambers is usually sufficient. The last chamber preferably has pumping blades for product discharge. Organopolysiloxane (O) and structure improver (S) are preferably fed into the first chamber. The filler(s) (F), for example, can also be fed into one or more chamber(s) of the kneading cascade. Preference is given to introducing all of the organopolysiloxane (O) into the first chamber. It is also possible to introduce part of the organopolysiloxane (O) into a later chamber, e.g. in order to reduce the viscosity of the organopolysiloxane composition (A). The required fillers (F) can be introduced into all chambers; preference is given to no filler (F) being introduced into the first and last chambers. It is possible to add the total amount of filler required only in, for example, one/two/three or four of the first chambers. Filler (F) is preferably introduced into chambers 2 and 3. Distributing the addition of filler over all of the chambers is however also possible. If structure improvers (S) are used, they are preferably introduced into the first chambers, in particular into the first chamber. Preference is given to no structure improver (S) being introduced into the last chamber. The kneading cascade preferably has at least three, in particular at least five, kneading chambers.

Screens, diaphragm plates or slide valves for restricting the flow of the organopolysiloxane compositions (A) can be installed between individual kneading chambers or all kneading chambers. These elements can be adjustable in terms of their position and the open area left free by them. The residence time in the individual chambers can be influenced in this way. The kneading tools are preferably kneading blades, rollers or polygonal plates.

The kneading machine is preferably provided with, in addition to the feed opening of the first kneading chamber, further feed openings which lead into the individual kneading chambers or are located between two kneading chambers. Preference is given to each kneading chamber having a feed opening. In particular, the feed openings of the first 2, 3 or 4 kneading chambers are suitable for the introduction of solids and the other feed openings are provided for the introduction of liquids.

Each kneading chamber preferably has a separately regulatable drive which in each case preferably has torque measurement capability. The torque is a measure of the viscosity of the mixture in the chamber.

The kneading chambers are preferably heatable and/or coolable, and in particular can be operated individually at different temperatures. Kneading produces heat of friction which is preferably partly removed by cooling in order to avoid overheating of the composition.

The kneading tools are preferably mounted free-standing on bearings. The bearing-side wall of the housing is then provided with openings for the drive shafts of the kneading tools. The housing of the kneading chambers preferably has a line of separation running transverse to the axes of the tools, so that the part of the housing opposite the bearings can be moved away from the line of separation and the kneading tools in the direction of the axes of the drive shafts. A kneading machine having such a configuration is particularly easy to clean. A kneading machine of this type is described in EP 807509A.

The temperatures of the compositions in the kneading chambers in the process of the invention are not more than 280° C., preferably not more than 240° C.

After the last kneading chamber, the rubber is preferably pumped through a short flexible connecting piece directly into the double trough kneader. However, a transport device can also be utilized as connecting means. The double trough kneader is preferably equipped with two sigma kneading blades and a discharge screw. The kneading blades preferably each have a separate drive and are preferably heatable and coolable. The speed of rotation can preferably be adjusted steplessly and separately for each blade. A change in the direction of rotation is preferably possible.

The degree of fill of the double trough kneader is preferably kept constant at from 40 to 60%, i.e. the discharge screw is regulated so that input and discharge are in equilibrium. In the case of a small malfunction in the apparatuses downstream of the kneader, the remaining kneader volume can be utilized as buffer, which makes the overall process very robust and minimizes the proportion of out-of-spec product.

The kneader is preferably operated at a low subatmospheric pressure of from 1 to 150 mbar absolute. The product temperature is preferably kept constant and is preferably, depending on the product, at least 100° C., in particular at least 130° C., preferably not more than 250° C., and in particular not more than 220° C.

Apart from the kneading blades, the trough is preferably also equipped with a double wall in order to be able to control the temperature of the product.

The average residence time of the product in the kneader can be varied over a wide range. Preference is given to at least 5 min, in particular at least 30 min, preferably not more than 5 h, and in particular not more than 3 h.

To be able to achieve a narrow residence time distribution in the kneader, the inlet opening and the outlet openings in the kneader are kept as far apart as possible. The geometry of the blades is selected so that the product is kept away from the outlet opening for as long as possible.

In the preparation of the organopolysiloxane (A) composition, the composition runs through both process steps without intermediate storage of product.

The further processing of the then well-kneaded and degassed organopolysiloxane composition (A) is unproblematic and not a subject matter of the invention.

The filler content of the organopolysiloxane compositions (A) is from 5 to 80% by weight, preferably from 10 to 50% by weight. Particular preference is given to preparing organopolysiloxane compositions (A) having a filler content of from 20 to 40% by weight.

Possible fillers (F) are all fillers customarily used in silicone compositions, and it is also possible to use mixtures of various fillers. Suitable fillers (F) are, for example, silicas, quarz flours, carbon black, metal oxides, metal carbonates, metal sulfates, metal silicates, metal nitrides, diatomaceous earth, clays, chalk, mica, metal powders, activated carbon, powders of organic polymers, etc. It is important that the viscosity of the filler-containing organopolysiloxane compositions (A) is, as a result of the filler content, significantly higher than the viscosity of the organopolysiloxane (O) which is to be mixed in a continuous fashion into this filler-containing silicone composition. Preference is given to reinforcing fillers (F), i.e. fillers having a specific surface area determined by the BET method of at least 50 m²/g, preferably 50-500 m²/g, e.g. pyrogenic silica, silica hydrogels which have been dewatered with retention of the structure, i.e. aerogels, other types of precipitated silicon dioxide and also carbon black. The particularly preferred pyrogenic silicas, precipitated silicas and carbon blacks can, if desired, have been subjected to a surface treatment, e.g. to improve their dispersibility. The oxidic reinforcing fillers (F) can be prehydrophobicized and in this case preferably have a carbon content resulting from the hydrophobicization of at least 0.5. It is also possible to use mixtures of prehydrophobicized and non-prehydrophobicized oxidic reinforcing fillers (F).

In particular, silicone resins of the $M_w D_x T_y Q_z$ type which are solid at room temperature in pure form can also be present.

The organopolysiloxanes (O) on which the organopolysiloxane composition (A) is based can be one organopolysiloxane (O) or a mixture of various organopolysiloxanes (O). Basically, all organopolysiloxanes (O) which have been described hitherto and are well known to those skilled in the art for the preparation of HTV, LSR, RTV-1 and RTV-2 compositions can be used. These include linear, branched, cyclic or resin-like organopolysiloxanes which may contain functional groups, usually for the purposes of crosslinkability. Preference is given to using linear organopolysiloxanes (O) such as polydimethylsiloxanes having a degree of polymerization of from 50 to 9000. Preferred organic radicals on the organopolysiloxanes (O) are methyl, phenyl, vinyl and trifluoropropyl radicals, more preferably the methyl radical. The functional groups preferably present in the polyorganosiloxanes are —SiOH, —SiOR, Si-vinyl and —SiH, most preferably the vinyl group. Particularly preferred organopolysiloxanes (O) are the organopolysiloxanes (O) which are customarily used for the preparation of thermally curing HTV silicone compositions and have a Brabender value measured at 25° C. of from 200 to 900 daNm, in particular from 400 to 700 daNm. The composition of the organopolysiloxanes (O) preferably corresponds to the average formula (I)

$$R^1_a R^2_b SiO_{(4-a-b)/2} \tag{1}$$

where the radicals $R^1$ are identical or different monovalent Si-bonded radicals selected from among —H, —OH, —OR, where R is a $C_1$-$C_{10}$-hydrocarbon radical, and unsubstituted, halogen-substituted or cyano-substituted $C_1$-$C_{10}$-hydrocarbon radicals which contain at least one aliphatic carbon-carbon multiple bond and may be bound to silicon via a divalent organic group, $R^2$ are identical or different monovalent Si-bonded, unsubstituted, halogen-substituted or cyano-substituted $C_1$-$C_{10}$-hydrocarbon radicals which contain no aliphatic carbon-carbon multiple bonds, a is a non-negative number in the range from 0 to 1, and b is a non-negative number in the range from 1 to 2.1.

$R^1$ is preferably an alkenyl group which is able to react with an SiH-functional crosslinker or with a peroxide. Alkenyl groups having from 2 to 6 carbon atoms, e.g. vinyl, allyl, methallyl, 1-propenyl, 5-hexenyl, ethynyl, butadienyl, hexadienyl, cyclopentenyl, cyclopentadienyl, cyclohexenyl, preferably vinyl and allyl, are usually used.

Organic divalent groups via which the alkenyl groups may be bound to silicon of the polymer chain comprise, for example, oxyalkylene units such as those of the formula (2)

$$-(O)_p[(CH_2)_q O]_r- \tag{2}$$

where p is 0 or 1, preferably 0, q is from 1 to 4, in particular 1 or 2, and r is from 1 to 20, in particular from 1 to 5.

The oxyalkylene units of the formula (2) are bound at the left-hand end to a silicon atom.

The radicals $R^1$ can be bound to the polymer chain in any position, in particular at the terminal silicon atoms.

$R^2$ preferably has from 1 to 6 carbon atoms. Particular preference is given to methyl and phenyl.

The structure of the polyorganosiloxanes of the formula (1) can be linear, cyclic or branched. The content of trifunctional and/or tetrafunctional units which lead to branched polyorganosiloxanes is typically very low, preferably not more than 20 mol %, in particular not more than 0.1 mol %.

Particular preference is given to using polydimethylsiloxanes which contain vinyl groups and whose molecules have the formula (3)

$$(ViMe_2SiO_{1/2})_c (ViMeSiO)_d (Me_2SiO)_e (Me_3SiO_{1/2})_f \tag{3}$$

where Vi is a vinyl radical and Me is a methyl radical, and the non-negative integers c, d, e and f obey the following relationships: $c+d \geq 1$, $c+f=2$, $1000 < (d+e) < 9000$, preferably $3000 < (d+e) < 7000$, and $0 < (d+1)/(d+e) < 1$, preferably $0 < (d+1)/(d+e) < 0.1$.

The organopolysiloxane compositions (A) can further comprise additives (Z) which make it possible to set specific properties, in particular processing aids such as structure improvers (S); dispersants; hydrophobicizing agents, for example silazanes, silanol-containing oligosiloxanes and destructuring agents.

Particularly preferred additives are the hydrophobicizing agents which aid incorporation of hydrophilic fillers (F) such as hydrophilic pyrogenic or precipitated silica, e.g. silanol-containing oligosiloxanes and also trimethylsilyl-terminated oligodimethylsiloxanes.

As structure improvers (S) preference is given to organopolysiloxanes having a viscosity measured at 25° C. of from 10 to 200 mP·s, in particular from 20 to 150 mPa·s. Silanol-containing oligosiloxanes and trimethylsilyl-terminated dimethyl(oligo or poly)siloxanes are preferred. The radicals of the organopolysiloxanes used as structure improvers (S) are preferably selected from among methyl, phenyl, vinyl and hydroxyl groups.

The organopolysiloxane compositions (A) prepared by the process of the invention are relatively high-viscosity silicone compositions having a viscosity of at least 500 Pa·s measured at 25° C. The process of the invention is particularly useful for preparing relatively high-viscosity organopolysiloxane compositions (A) having a Brabender plasticity measured at 25° C. of from 100 to 1000 daN·m, and also very high-viscosity organopolysiloxane compositions (A) having a viscosity determined by the method of Mooney of from 10 to 200 Mooney units (final Mooney value, ML(1+4), 23° C., DIN 53523).

The process of the invention is particularly useful for preparing highly filled, high-viscosity organopolysiloxane compositions (A), high-viscosity silicone pastes and highly filled silicone masterbatches. The heat-curable HTV organopolysiloxane compositions (A1) can also be base mixtures which are used to produce ready-to-use crosslinkable HTV compositions.

All of the symbols in the formulae above have their meanings independently of one another.

In the following examples, all amounts and percentages are by weight and all pressures are 0.10 MPa (abs.), unless indicated otherwise. All viscosities were determined at 20° C.

All the examples which demonstrate the process of the invention and the comparative examples were carried out using a silicone rubber composition comprising the following constituents as a basis:

Solid HTV Polymer:

100 parts by weight of a solid HTV polymer which has a viscosity of about 20,000 Pa·s at a temperature of 25° C. and a shear rate of 0.81 1/sec and, according to the $^1$H NMR spectrum, has the following number-average composition:

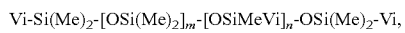

where Me is the methyl radical and Vi is the vinyl radical, n+m is about 6000 and m/n is about 3000.

Structure Improver:

2-16.7 parts by weight of a structure improver which, according to the $^{29}$Si NMR spectrum, has the following number-average composition:

where m is about 14 and the viscosity measured at a temperature of 25° C. is 41 mm$^2$/s.

Silica:

40-50 parts by weight of a pyrogenic silica which is obtainable under the trade name Wacker HDK® T30 and has a specific surface area measured by the BET method of 300 m$^2$/g.

EXAMPLES 1-3

Process of the Invention

The process is described with reference to FIG. 1: the 1st stage was carried out using a Conterna kneading cascade (3) from IKA Maschinenbau Janke & Kunkel GmbH & Co. KG, Staufen. The kneading cascade (3) had 6 chambers, each having a volume of 10 l. The total throughput was 200 kg/h.

The polymer (120 kg/h) and the structure improver (20 kg/h) were metered into the feed line to chamber 1 (1) and the filler (60 kg/h) was metered into the feed line (2) to chamber 2. The total throughput was therefore about 200 kg/h. The rotational speeds in the chambers 1-4 were 35 rpm. Recording of the power drawn by the individual drives of the chambers showed that the composition had a lumpy consistency in the 2nd and 3rd kneading chambers. In the 4th kneading chamber, the power drawn was steadier and higher: a homogeneous cohesive composition was present here. Chambers 1-4 were operated at 35 rpm. In chambers 5 and 6, further kneading took place at 40 rpm and at the same time the product was discharged from chamber 6. The 6 chambers were not cooled and not heated, and the temperatures ranged from about 45° C. in the 1st chamber to about 150° C. in the 6th chamber.

The raw rubber discharged from chamber 6 was taken off continuously (30 kg/h) via a transition piece (9) and fed continuously via an AZ feeder from Krauss Maffei, which served as transport device, into a 100 l sigma kneader (4) provided with a lamp (6), vacuum connection (7), sight glass (8) and discharge screw (5). The kneader (4) was heated to about 200° C. and evacuated to a subatmospheric pressure of about 100 mbar. After the kneader (4) had been half-filled, material was discharged continuously via the discharge screw (5). The amount discharged was set so that the degree of fill of the kneader (4) remained approximately constant.

The rubber was vulcanized between plates in a heatable press:

a) by means of 0.7% of dicumyl peroxide (crosslinker 1) for 15 minutes at 165° C. or
b) by means of 1.5% of di(2,4-dichlorobenzoyl) peroxide (50% strength) (crosslinker 2) for 10 minutes at 135° C.

The vulcanizates were subsequently heated at 200° C. for 4 hours in a convection oven, and the appearance of these vulcanizates, i.e. the degree of discoloration, was then assessed.

Three different products 1-3 were produced. One hour after reaching stable continuous production, a sample was in each case taken and then tested.

TABLE 1

| | Experimental conditions | | |
|---|---|---|---|
| Product: | Average residence time | Temperature in the sigma kneader | Subatmospheric pressure in the sigma kneader |
| 1 | 2 h | 185° C. | 100 mbar |
| 2 | 1.5 h | 180° C. | 150 mbar |
| 3 | 2 h | 200° C. | 140 mbar |

TABLE 2

| | Results | | |
|---|---|---|---|
| Product: | Compression set | Color B value | Shore A hardness |
| 1 | 16 | 12 | 39 |
| 2 | 18 | 7.5 | 58 |
| 3 | 18 | 9 | 70 |

The lower the B value, the lower the yellow coloration. The color can be described by three coordinates referred to as L, a, and b. L is the lightness axis, b is the yellow-blue axis and a is the red-green axis.

Comparative Examples C1-C3 not According to the Invention

Analogous to the Process of EP 1468803 A 15 kg/h of the raw mixture taken as in example 1 from the Conterna® kneading cascade (3) was fed without intermediate storage into a type LR 100/19D kneader from "Buss Compounding Systems AG".

The kneader was divided into 5 zones (sections) having the following structure: 1st zone 3D, 2nd-5th zone each 4D. All zones were separated from one another by flow-restricting rings. A vacuum of 100 mbar (abs.) was applied by means of a water ring vacuum pump to zones 2-5. The temperature control of the individual sections and the shaft of the kneader was selected so that, beginning from the 2nd section at a rotational speed of the shaft of 150 rpm, a product temperature of about 180-200° C. was established along the kneader. The raw mixture produced in the kneading cascade (4) was fed at a product temperature of about 150° C. into zone 1 of the reciprocating kneader. It was intensively kneaded in zones 2-5 and volatile constituents were at the same time removed from the rubber compositions. Additives (Z) can be introduced into the 2nd-5th sections. The rubber was discharged via a cooled discharge screw and examined as for products 4 to 6.

TABLE 3

| | Results | | |
|---|---|---|---|
| Product: | Compression set | Color B value | Shore A hardness |
| C1* | 21 | 14 | 39 |
| C2* | 20 | 8 | 59 |
| C3* | 21 | 12 | 70 |

*not according to the invention

Summary: The products 1 to 3 produced according to the invention display slightly improved compression sets, a somewhat lower yellow coloration and unchanged mechanical properties compared to the products C1 to C3 produced according to EP 1468803A.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A continuous process for preparing organopolysiloxane compositions having a viscosity measured at 25° C. of at least 500 Pa·s., comprising mixing and kneading organopolysiloxanes and fillers, in a first process stage in a kneading cascade having at least two kneading chambers which are arranged in series next to one another and each contain two kneading tools which have parallel axes and are capable of being driven in corotating or counterrotating directions and which are connected to one another by means of openings through which material can pass in a direction transverse to the axes of the kneading tools, with the first kneading chamber having a feed opening and the last kneading chamber having a discharge opening, to give raw mixtures, and kneading and degassing the raw mixtures in a second process stage at from 100° C. to 250° C. in a continuously operated double trough kneader having a discharge screw.

2. The process of claim 1, wherein the kneading cascade comprises from 3 to 10 kneading chambers.

3. The process of claim 1, wherein the average residence time of the organopolysiloxane compositions in the double trough kneader is from 30 min to 3 h.

4. The process of claim 2, wherein the average residence time of the organopolysiloxane compositions in the double trough kneader is from 30 min to 3 h.

5. The process of claim 1, wherein the degree of fill of the double trough kneader is kept constant at from 40 to 60% during ordinary operating conditions.

6. The process of claim 1, wherein the filler content of the organopolysiloxane compositions is from 5 to 80% by weight.

7. The process of claim 1, wherein silicas having a specific surface area determined by the BET method of at least 50 $m^2/g$ are used as fillers.

8. The process of claim 1, wherein polydimethylsiloxanes whose molecules have the general formula (3)

$$(ViMe_2SiO_{1/2})_c(ViMeSiO)_d(Me_2SiO)_e(Me_3SiO_{1/2})_f \qquad (3)$$

where Vi is a vinyl radical and Me is a methyl radical, and the non-negative integers c, d, e and f obey the following relationships: $c+d \geq 1$, $c+f=2$, $1000<(d+e)<9000$, and $0<(d+1)/(d+e)<0.1$, are used as organopolysiloxanes.

9. The process of claim 1, wherein organopolysiloxanes having a viscosity measured at 25° C. of from 10 to 200 mPa·s are added as structure improvers.

10. The process of claim 8, wherein $3000<(d+e)<7000$.

11. The process of claim 8, wherein $0<(d+1)/(d+e)<0.1$.

12. The process of claim 10, wherein $0<(d+1)/(d+e)<0.1$.

13. The process of claim 1, wherein the double trough kneader is equipped with two sigma kneading blades.

14. The process of claim 1, wherein the double trough kneader has a double wall to control temperature in the kneader.

15. The process of claim 1 wherein inlet and outlet openings in the double trough kneader are spaced apart to provide a narrow residence time distribution.

16. The process of claim 1, wherein blades of the double trough kneader have a geometry such that the product for the kneader tends to be kept away from the discharge of the kneader.

* * * * *